United States Patent [19]

Fujiwara

[11] Patent Number: 4,771,338
[45] Date of Patent: Sep. 13, 1988

[54] IMAGE READING DEVICE FOR FACSIMILE SYSTEM

[75] Inventor: Toshiaki Fujiwara, Nara, Japan

[73] Assignee: Sharp Kabushiki Kaisha, Osaka, Japan

[21] Appl. No.: 924,263

[22] Filed: Oct. 29, 1986

[30] Foreign Application Priority Data

Oct. 30, 1985 [JP] Japan ............................... 60-243519

[51] Int. Cl.⁴ ............................................... H04N 1/04
[52] U.S. Cl. ................................ 358/294; 350/331 R; 350/332
[58] Field of Search ............... 358/294, 285; 350/510, 350/516, 331 R, 332, 333, 352; 354/457

[56] References Cited

U.S. PATENT DOCUMENTS 4,561,731 12/1985 Kley ............................ 350/331 R
4,601,537 7/1986 Saccocio ............................ 358/225
4,606,612 8/1986 Iizuka ............................ 350/331 R
4,652,916 3/1987 Suzaki ............................ 350/331 R

FOREIGN PATENT DOCUMENTS 124169 7/1985 Japan ............................ 358/294

Primary Examiner—Tommy P. Chin
Attorney, Agent, or Firm—Birch, Stewart Kolasch & Birch

[57] ABSTRACT

An image reading device includes a light emitting element, a light receiving element, a liquid crystal shutter array, and a circuit for driving the shutter array in a timesharing manner. The light reflected from a document is prevented from passing by the shutter array which is driven in the timesharing manner, so that the light receiving element can receive the light in the timesharing manner.

4 Claims, 1 Drawing Sheet

U.S. Patent     Sep. 13, 1988     4,771,338
FIG. 1
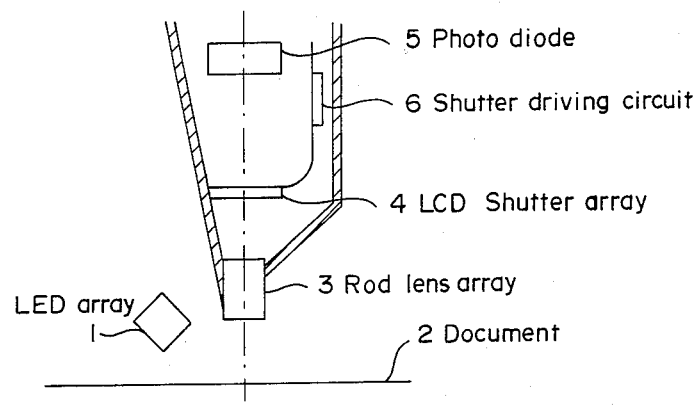
FIG. 2
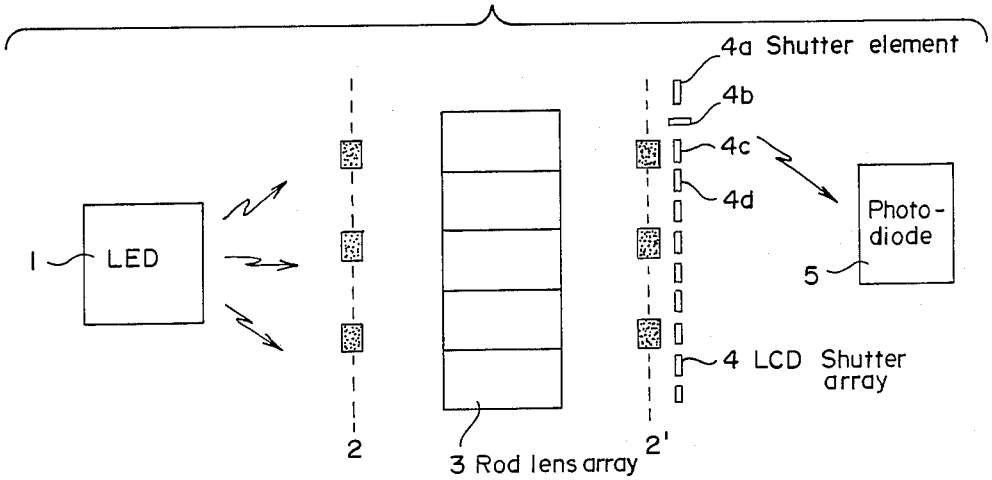
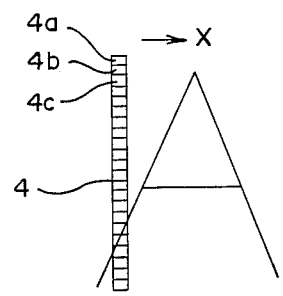
FIG. 3
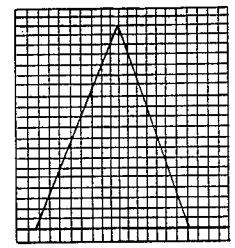
FIG. 4

IMAGE READING DEVICE FOR FACSIMILE SYSTEM

BACKGROUND OF THE INVENTION

The present invention relates to a image reading device and, more particularly, to an image reading device for a fascimile system.

The conventional image reading device includes a lens for focusing an image of a document onto a receiving element array to read the image. Conventionally, the receiving array is a plurality of one-dimensional elements such as a one-dimensional charge coupled device (CCD) or MOS type one-dimensional image sensor. The number of the plurality of elements depends on the size of the document and the resolution of reading. To increase the document size or the resolution, the number of the elements also increases becomes great, resulting in a high cost of for the elements. Conventionally, the image of the document is focused on the receiving array with the lens or the like, so that a long light path is needed and thereby requiring a large device.

SUMMARY OF THE INVENTION

Accordingly, it is an object of the present invention to provide an improved image reading device for a facsimile system for reducing the number of image receiving elements.

It is another object of the present invention to provide an improved image reading device for a facsimile system requiring a short light path.

Briefly described, in accordance with the present invention, an image reading device includes light emitting means for emitting light toward a document, light receiving means for receiving light reflected from the document and providing signals corresponding to the image of the document, and liquid crystal shutter array means interposed between the light emitting means and the light receiving means. Each shutter of the shutter array is driven in a timesharing manner, so that one or several light receiving elements can recognize the image of the document.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a cross-sectional view of a image reading device of the present invention;

FIGS. 2 and 3 show image reading operations by the image reading device of FIG. 1; and FIG. 4 shows an image reading operation with another image reading device of the present invention.

DESCRIPTION OF THE PREFERRED EMBODIMENTS

FIG. 1 is a cross-sectional view of an image reading device according to the present invention.

The device of FIG. 1 comprises a light emitting diode (LED) array 1 for emitting light toward an image on a document 2 such as a paper, a rod lens array 3 having a large number of glass fiber lenses each of, for example, 1 mm diameter, wherein each of the lens is extended along its own light path. For example, therod lens array may be produced under the trade name "SLA" produced by Nippon Sheet Glass Co., Ltd. The image on the document 2 can be focused on a light crystal shutter array 4 in the same scale.

The liquid crystal shutter array 4 is positioned between the document 2 and a photodiode 5 for receiving the light reflected from the document 2. The liquid crystal shutter array 4 includes a plurality of shutter elements each made of a liquid crystal cell. When a voltage is applied to the liquid crystal cells of the liquid crystal shutters, the liquid crystal cells change to transparent, so that light can pass through respective ones of the shutters. On the other hand, when no voltage is applied to respective ones of the liquid crystal cells of the shutters, they are opaque so that the light can be shut out. According to the gist of the present invention, using this operation principle, the light reflected from the document 2 and passing through the rod lens array 3 is divided in a one- or 2-dimensional manner, so that the light corresponding to each part of the document image can be forwarded to the photodiode 5. A shutter driving circuit 6 is provided for driving the liquid crystal shutters in a timesharing manner. The photodiode 5 is provided for receiving the reflection light passing through the liquid crystal shutters 4, so that the photodiode 5 produces signals corresponding to the image on the document 2.

FIG. 2 shows an operational principle of the image reading device of FIG. 1. When the light from the LED array 1 is emitted onto the document 2, some black portions of the document will absorb the light and white portions will reflect the light. The rod lens array 3 serves to guide the reflected light toward the shutter array 4, so that an image figure 2' corresponding to the image appears on the shutter array 4 in the same scale.

According to the present invention, the liquid crystal shutters 4a, 4b, are driven in a timesharing manner with the driving circuit 6. Assuming that the voltage is applied to a shutter element 4b and it becomes transparent and that no voltage is applied to the other shutter elements 4a, 4c, ..., and they are opaque, the light passing through the element 4b is incident on the photodiode 5 and the light incident on the other shutter elements is blocked out. The photodiode 5 receives the light passing through the element 4b and produces the signals corresponding to a part of the image 2' on the shutter array 4, the part being on the shutter element 4b. Thus, according to the light amount passing through the shutter element 4b, the part of the focused image on the shutter element 4b can be detected to be white or black.

When voltage is applied to the shutter element 4c, the light incident onto shutter element 4c can pass through it so as to be finally detected by the photodiode 5. The other shutter elements 4a, 4b, 4d, ... all prevent the light from passing therethrough. Thus, the photodiode 5 can provide the signals corresponding to the part of the focused image on the shutter element 4c.

In this manner, timesharing driving of all the shutter elements is conducted. The single photodiode 5 can receive whole parts of the focused image. The resolution of the image depends on the density of the shutter elements of the shutter array 4.

The shutter array 4 includes a single line of shutter elements as shown in FIG. 3.

The shutter element line including the shutter elements 4a, 4b, 4c, ... sweeps out in the normal direction X, so that the image can be read in a 2-dimensional manner.

When the liquid crystal shutter array 4 includes a matrix array of shutter elements as shown in FIG. 4, there is no need to sweep the shutter array to read the image.

In the above-described embodiment, a single photodiode 5 is provided. A plurality of photodiodes may be provided for sharing the light receiving sections to make reading rapid.

According to the present invention, the single light receiving photodiode can receive the reflected light from the document by driving the shutter array in the timesharing manner. With the help of the rod lens array, the light path can be reduced so as to make the reading system compact.

While only certain embodiments of the present invention have been described, it will be apparent to those skilled in the art that various changes and modifications may be made therein without departing from the spirit and scope of the present invention as claimed.

What is claimed is:

1. A reading device for reading an document image on a document, comprising:
    light emitting means for emitting light toward said document;
    a single light receiving means for receiving light reflected from said document and producing signals corresponding to the reflected document image;
    liquid crystal shutter array means for selectively transmitting reflected light from said document to said light receiving means, said shutter array means including a plurality of shutter elements, each made of a liquid crystal cell;
    a rod lens array for guiding said reflected light from said document to said liquid crystal shutter array means, said rod lens array having a plurality of glass fiber lenses wherein each of the plurality of lenses extend along its own light path for focusing the reflected document image onto said liquid crystal shutter array means, said liquid crystal shutter array being positioned between said rod lens array means and said light receiving means;
    a shutter driving circuit for driving each of said plurality of shutter elements in a time sharing manner, wherein said reflected light from said document passing through said rod lens array is divided in a one or a two-dimensional manner such that light corresponding to each portion of said document image is forwarded to said light receiving means, and
    wherein a voltage applied by said shutter driving circuit to one of said plurality of liquid crystal cells of a corresponding one of said shutter elements changes said cell to a transparent cell so that light can pass through said shutter element and the absence of said voltage renders said liquid crystal cell opaque such that light will not pass through said shutter, element such that said reflected document image will be sequentially forwarded to said light receiving means in a time sharing manner for reading the reflected image with said single light receiving means.

2. The device of claim 1 wherein said liquid crystal shutter array means is arranged linearly.

3. The device of claim 1 wherein said liquid crystal shutter array means is arranged in a matrix configuration.

4. The device of claim 1 wherein said light receiving means is a single photodiode.

* * * * *